No. 876,168. PATENTED JAN. 7, 1908.
I. L. GOODRICH.
VEHICLE WHEEL.
APPLICATION FILED FEB. 9, 1906.

Witnesses: Inventor:

UNITED STATES PATENT OFFICE.

IRA L. GOODRICH, OF CURPERTINO, CALIFORNIA.

VEHICLE-WHEEL.

No. 876,168.  Specification of Letters Patent.  Patented Jan. 7, 1908.

Application filed February 9, 1906. Serial No. 300,239.

*To all whom it may concern:*

Be it known, that I, IRA L. GOODRICH, citizen of United States, residing at Curpertino, in the county of Santa Clara and State of California, have invented new and useful Improvements in Vehicle-Wheels, of which the following is a specification.

My invention relates to vehicle wheels and especially to automobile wheels employing pneumatic or cushion tires.

The object of my invention is to provide a wheel with the necessary resiliency to render the vehicle easy riding, but which will obviate the disadvantages of the ordinary puncturable pneumatic tires.

The invention consists of the parts and the construction and the combination of parts as hereinafter more fully described and claimed, having reference to the accompanying drawings, in which—

Figure 1:
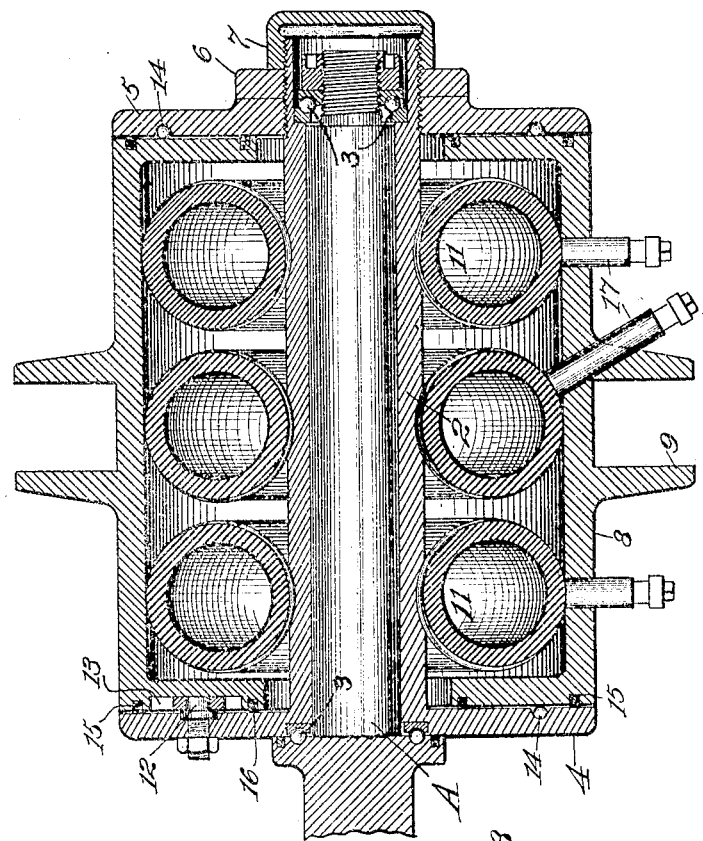
Figure 2:
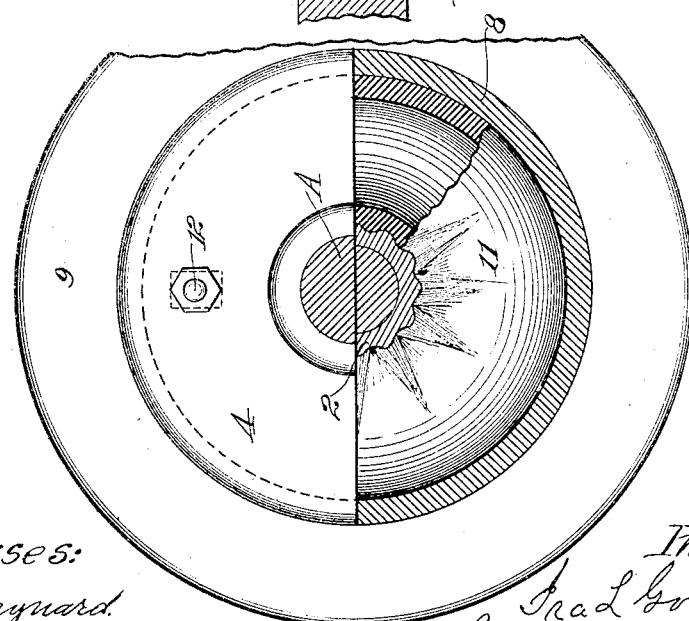

Figure 1 represents a section of the hub of a wheel embodying my invention. Fig. 2 is an end elevation partially in section.

A represents a vehicle axle or spindle about which the sleeve 2 is turnable on suitable anti-friction bearings 3. The inner end of the sleeve carries an annular flange 4, and the outer end of the sleeve is threaded to receive a centrally perforated threaded disk 5. The disk is adapted to be locked in fixed position on the sleeve by suitable means, as the nut 6 and the combined set-nut and dust-cap 7.

Operating between the parts 4—5 is the hub 8 which is made hollow and has an interior bore of considerably greater diameter than the outside diameter of the sleeve 2. The hub may be made of wood, metal or any other suitable material. It is here shown as comprising a metal cylinder with suitable means as 9 on its outside circumference for the receipt of the spokes, and as having inwardly turned annular flanges at its ends which slide between the parts 4—5.

11 represents a plurality of inflatable annular cells or pneumatic tubes or tires arranged between the sleeve and hub and housed by the latter and adapted to maintain the hub out of contact with the sleeve but permitting a limited radial movement of the hub with respect to the sleeve and axle. These inflatable tubes or tires 11 are of suitable resilient material, and are of sufficient number to provide the necessary support for the vehicle. The tubes are preferably corrugated transversely and are seated in corresponding corrugated shallow annular grooves in the sleeve; the purpose of the corrugations being to prevent creeping and to maintain, or assist to maintain, the hub against rotation independent of the sleeve. Other brace connections may be employed, if desired, to limit the independent rotative movement of the hub relative to the sleeve, but which brace connections do not interfere with the radial movement of the hub with respect to the sleeve. This radial movement of the hub is essential to the ends of the invention.

I have shown the flange 4 as having an inwardly projecting pin 12 operating in a radial slot 13 in the hub to provided a positive drive connection between the sleeve and the hub, and relieve the tubes 11 of undue strain and wear. In order to reduce the sliding friction of the hub on the parts 4—5, said parts 4—5 may be provided each with an annular series of balls 14 on which the smooth surfaces of the ends of the hub may slide. Dust and other dirt may be excluded from the balls 14 and the interior of the hub by suitable means, as the annular felt packings 15—16 interposed between the hub and parts 4—5, with one packing as 15 arranged outside of the series of balls 14, and the other packing 16 arranged inside of the same series.

The several tubes are separately inflatable through the nipples 17. With the several tubes pumped up sufficiently hard, the hub will stand substantially concentric with the axle. In the event of striking a bump or chuck hole, the tubes will be compressed on the underside of the axle to relieve the vehicle of shock and jar. This compression of the tubes on one side of the axle will cause a limited radial movement of the hub with respect to the axle and sleeve. It will thus be seen that the resiliency afforded the vehicle wheel by the ordinary single pneumatic tire running upon the ground, will here be effected by a plurality of pneumatic tires within the hub and entirely housed and protected from those agencies which limit the life and usefulness of an ordinary pneumatic tire.

One of the main features of the invention is the use of a plurality of spaced annular cells or pneumatic tires as shown, for the reason that each tube being wholly independent of the other will operate to maintain the tread of the wheel normally in a plane at right angles to the axle. In case the vehicle is on a side-hill the tubes at one end of the hub may be compressed more than the others, but the moment that the vehicle comes to the level again, the pressure on the tubes is equalized; those tubes which were previously compressed will expand until they are all practically of the same diameter. If a single air cushion filling the entire hub space were employed, the air displaced adjacent to one end of the hub would expand at the other end of the hub and re-adjustment of the hub and wheel on the release of pressure would not take place with the same promptness and satisfaction as occurs where separate air cushions are employed on each side of the center of the wheel as in my construction.

Having thus described my invention, what I claim and desire to secure by Letters Patent is—

1. In a wheel construction, the combination of a stationary axle, a sleeve rotatable thereon, a hollow hub having a limited radial movement relative to the sleeve, annular air cushions between said sleeve and hub, fixed and movable annular flanges at the ends of the sleeve, said hub having annular ends opposing said flanges, said flanges each having an annular groove and a series of balls within said groove and engaging the contiguous surface of the annular end head of the hub, and annular packings between the end heads of the hub and the flanges, one of said packings being arranged outside of the series of balls and the other packing being arranged inside of the same series of balls whereby a dust-proof joint is formed.

2. In a wheel construction, the combination of a stationary axle, a sleeve rotatable thereon, a hub surrounding the sleeve, annular air cushions between the sleeve and hub, said hub having integral flanges at the ends substantially closing said ends and forming a housing for the air cushions, fixed and movable flanges at the ends of the sleeve opposing the end flanges of the hub, and ball-bearings between the fixed and movable flanges and the contiguous end flanges of the hub, annular packings between the hub and flanges, one of said packings being arranged outside of one of the ball-bearings and the other packing being arranged inside of this same ball-bearing, said cushions having nipples extending through the hub to allow the cushions to be inflated from the outside.

In testimony whereof I have hereunto set my hand in presence of two subscribing witnesses.

IRA L. GOODRICH.

Witnesses:
S. H. NOURSE,
D. B. RICHARDS.